United States Patent [19]

Muntz et al.

[11] 4,067,856

[45] Jan. 10, 1978

[54] PROCESS FOR PREPARING POLYESTERS WITH A CATALYST SYSTEM COMPRISING AN ANTIMONY-CONTAINING POLY-CONDENSATION CATALYST AND AN ETHYLENICALLY UNSATURATED COMPOUND

[75] Inventors: Ronald L. Muntz, Bedford Hills; Francis A. Via, Yorktown Heights, both of N.Y.

[73] Assignee: Stauffer Chemical Company, Westport, Conn.

[21] Appl. No.: 688,797

[22] Filed: May 21, 1976

[51] Int. Cl.$^2$ .................... C07C 69/76; C08G 63/12
[52] U.S. Cl. .................................. 260/75 R; 560/76; 560/89

[58] Field of Search ................. 260/75 R, 446, 475 P, 260/475 N

[56] References Cited

PUBLICATIONS

Polyesters, vol. 2, Parkyn et al., p. 41, 3.7.6.

*Primary Examiner*—Edward M. Woodberry
*Attorney, Agent, or Firm*—Ellen P. Trevors; Daniel S. Ortiz

[57] ABSTRACT

A polycondensation process employing a catalyst system comprising an antimony-containing polycondensation catalyst and selected ethylenically unsaturated compounds, such as allyl glycidyl ether. The ethylenically unsaturated compound stabilizes the antimony-containing catalyst.

7 Claims, No Drawings

PROCESS FOR PREPARING POLYESTERS WITH A CATALYST SYSTEM COMPRISING AN ANTIMONY-CONTAINING POLY-CONDENSATION CATALYST AND AN ETHYLENICALLY UNSATURATED COMPOUND

BACKGROUND OF THE INVENTION

This invention relates to a catalytic process for the polycondensation step of polyester production. More particularly, this invention relates to a stable catalytic process for the production of linear polyesters and copolyesters.

Polymers and copolymers of alkylene terephthalate have found wide spread commercial acceptance. For example, polyesters are used in the manufacture of textile fibers, films, resins, etc.

It is known that polyalkylene terephthalates can be prepared from a suitable alkyl ester of terephthalic acid formed by initially reacting the appropriate alcohol with terephthalic acid. When a methyl ester of terephthalic acid is used as a starting material, it is first reacted with alkylene glycol in the presence of a transesterification catalyst by means of an ester interchange reaction. When terephthalic acid, itself, is used as a starting material, it is subjected to a direct esterification reaction with alkylene glycol in the presence of what is generally called the first stage catalyst additive or ether inhibitor. In either method the resulting reaction product, an ester, is then polycondensed in the presence of a polycondensation catalyst to form polyalkylene terephthalate.

To polymerize a bis(hydroxyalkyl) terephthalate in a reasonable time it is necessary to use a catalyst. Many catalysts have been disclosed for this purpose but it has been found that those giving a rapid production rate also tend to bring about a rapid rate of polymer degradation. Another disadvantage is that many of the known catalysts produce a polymer having a yellowish or gray color. For the manufacture of fibers a color as near white as possible is required and for film making a clear bright polymer is necessary.

It has also long been known in the art that trivalent antimony compounds are excellent polycondensation catalysts. Antimony oxide has been long employed for this use as have various salts and alcohol derivatives such as the alkyl and aryl antimonites, the antimony glycolates, antimony acetates, and antimony oxalate.

However, many of these antimony-containing catalysts produce undesirable side effects, such as a slow rate of reaction, or polymer having a gray color which is undesired in the final terephthalate polymer. It is believed, as discussed in U.S. Pat. No. 3,732,182, that poor rates and gray color formation are caused by a reduction of the antimony catalyst to finely divided metallic antimony. This problem as indicated above has long been known and many attempts have been made to provide a solution.

For example, U.S. Pat. No. 3,484,410 proposes the utilization of trivalent antimony salts of the aliphatic hydrocarbon monocarboxylic fatty acids containing at least 12 carbon atoms, while U.S. Pat. No. 3,126,360 discloses the use of various compounds, including benzylic acid and mandelic acid, to be used as a stabilizer or decolorizing agent in the presence of antimony trioxide. U.S. Pat. No. 3,732,182 and U.S. Pat. No. 3,822,239 disclose the utilization of various antimony compounds together with certain alpha-hydroxy carboxylic acids, alpha-beta-dicarboxylic acids, and selected derivatives thereof.

Other antimony containing compounds have been proposed for uses other than polycondensation catalysts. Thus, U.S. Pat. No. 3,752,837 discloses the use of antimony aminoalkoxides as fire retardants; one aminoalkoxide is made by reacting antimony trioxide with the reaction product of hexaethylene heptamine with allyl glycidyl ether. A catalyst system for tetrahydrofuran comprising a salt such as triphenylmethyl antimony hexachloride and allyl glycidyl ether is described in U.S. Pat. No. 3,356,619. Japanese Pat. No. 7216,195 teaches a four-component catalyst system for the polymerization of alkylene oxides; the system can include an epoxy compound, triphenylantimonite, tributylaluminum and phosphoric acid.

Now it has been found in accordance with this invention that selected catalyst systems are efficacious polycondensation catalysts for the preparation of polyalkylene terephthalate.

SUMMARY OF THE INVENTION

The catalyst system of this invention comprises selected ethylenically unsaturated compounds that, when admixed or reacted with antimony-containing polycondensation catalysts, function to stabilize the catalyst. The effect of stabilization is to minimize antimony reduction, thereby effecting increased productivity. Furthermore, many of the systems of this invention result in the production of whiter polymers.

DETAILED DESCRIPTION OF THE INVENTION

More particularly the catalyst system of this invention comprises an antimony-containing polycondensation catalyst; and an ethylenically unsaturated compound having the formula

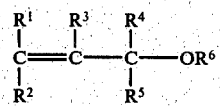
I wherein $R^1$, $R^2$, $R^3$, $R^4$ and $R^5$ are independently selected hydrogen, alkyl, aryl, substituted alkyl or substituted aryl and $R^6$ is hydrogen, alkyl, aryl, acyl, allyl or epoxypropyl. By the terms "substituted" in the claims and specification herein is meant groups containing substituents which do not adversely affect the polycondensation reaction. Typical substituents include hydroxyl, mercapto, amino, amido, imino, oxime, halo, aldehydo, alkoxy, alkylthio, keto, sulfinyl, sulfonyl, phosphato, phosphono, or phosphino; the substituted groups in $R^4$ being hydroxyl, mercapto, amino, amido, halo, carboxyl, carboxylate, haloformyl, carboxylic anhydride, aldehydo, alkoxy, alkylthio, keto, sulfinyl, sulfonyl, phosphato, phosphono or phosphino. It should be understood that the R groups in compound I can contain more than one of the named substituents.

Preferably the alkyl and acyl groups in compound I have from 1 to 18 carbon atoms, and the aryl groups from 6 to 18 ring carbon atoms.

Many of these ethylenically unsaturated compounds having the formula I are commercially available, while others are readily provided by known processes. For example, all compounds having the formula I can be prepared according to the Williamson ether synthesis as described in *Org. Syn. Coll Vol. I.* p. 75, 205, 258, 296 and 435; Wiley and Sons (1932) in accordance with the following equation where the R groups are as previously described, X is chlorine or bromine and M is an alkali metal:

R¹R²C=CR³—CR⁴R⁵X + R⁵OM → I + MX

Examplary ethylenically unsaturated compounds suitable for use in the practice of this invention include allyl alcohol, allyl acetate, allyl glycidyl ether, allyl phenyl ether, allyl hexyl ether, bis-1-octen-1-yl ether, (3-mercaptopropyl) allylether, 3-phenyl-1-octen-3-ol, (4-hydroxy-2-naphthyl) allyl ether, 1-methyl-1-propen-2-ol, 3-toluenesulfonyl-1-buten-4-ol, (4-diethylphosphono-2-buten-1-yl) glycidyl ether, methallyl(2-diethylphosphono-3-naphthyl) ether, ethyleneglycol diallyl ether, diallylterephthalate, etc.

While any of the aforementioned ethylenically unsaturated compounds can be used in the practice of this invention, preferred are those compounds I where R¹ through R⁵ are hydrogen and R⁶ is allyl or glycidyl.

The antimony-containing polycondensation catalysts useful in the system of this invention comprise the known antimony compounds useful for this purpose. Exemplary compounds include the antimony acids and salts thereof, such as antimonous acid, magnesium antimonite, zinc antimonite, calcium antimonite, manganese antimonite, etc.; antimony alkoxides such as trimethyl antimonite, tributyl antimonite, trihexyl antimonite, tridodecyl antimonite, tricyclohexyl antimonite, diethylmethyl antimonite, diethylacetyl antimonite, diethylphenyl antimonite, etc.; antimony carboxylates such as antimony acetate, antimony butyrate, antimony benzoate, antimony tolylate, antimony formate, etc.; antimony halides such as antimony bromide, antimony fluoride, antimony chloride, etc.; antimony sulfide; antimony oxides such as antimony trioxide; and antimony glycoxides such as antimony ethylene glycoxide, antimony butylene glycoxide, etc. The preferred polycondensation catalysts are the antimony acids, antimony alkoxides, antimony acetate and the antimony glycoxides.

In the practice of this invention, the components of the catalyst system are employed in a mole ratio of the ethylenically unsaturated bond in the ethylenically unsaturated compound, to the antimony-containing polycondensation catalyst of 1:1 to 30:1 and preferably in a ratio of 2:1 to 10:1. It should be emphasized that this mole ratio is calculated based on the number of ethylenically unsaturated bonds in the compound.

The catalyst system of this invention can be employed either by first preparing a reaction product, where the components are reactive, and then employing the reaction product in the polycondensation process, or by adding the components of the system directly to the polycondensation ingredients. If the latter technique is followed, it is believed that some kind of reaction product is formed in situ, because of the high temperature employed in the process.

Where a reaction product is prepared initially, the ethylenically unsaturated compound and the antimony-containing polycondensation catalyst are reacted at temperatures between about 0° C. and 250° C., preferably between about 50° and 150° C. Although the reaction proceeds readily in the absence of a diluent, inert solvents such as hydrocarbons can be used. While the reaction product can be separated from any by-product if desired, it is conveniently used directly in the polycondensation process.

Although the system of this invention is a polycondensation catalyst, it is not necessary to add the system immediately prior to the polycondensation step. Thus, if desired it can be employed directly from the beginning of the process where the glycol terephthalates are prepared.

As previously indicated, the glycol terephthalates, which are employed in the polycondensation process of this invention, are prepared either by direct esterification of terephthalic acid with an appropriate glycol such as ethylene glycol, 1,4-butanediol, 1,4-cyclohexanedimethanol, mixtures thereof, etc., or by the ester-interchange of a lower dialkyl ester of terephthalic acid with the glycol. This preliminary esterification or ester-interchange step is carried out according to known techniques. The resulting glycol terephthalate is then condensed in the presence of the catalyst system of this invention.

Various additives can be employed in this polycondensation step. For example, phosphorus-containing compounds, which are known to inhibit the ester-interchange reaction described above can be employed. Typical phosphorus-containing compounds include triphenyl phosphite, triphenyl phosphine, trihexylphosphate, triphenyl phosphate, tributylphosphate, triethyl phosphate and mono sodium phosphate. Copolycondensation components such as phthalic acid, succinic acid and the like can also be employed.

The polycondensation process of this invention is carried out at temperatures of 150° to 350° C., preferably in an inert atmosphere. A vacuum is generally applied to remove volatiles and the resulting polymer employed in the manufacture of fibers, resins, films, etc.

While it is not desired to be bound by theory, it is believed that the ethylenically unsaturated bond functions to stabilize the antimony in the catalyst, either by forming a ring compound or by forming a compound which acts as a chelating agent for the antimony catalyst.

The following examples will serve to illustrate the practice of this invention.

EXAMPLE 1

Allyl glycidyl ether was screened for thermal stability towards graying in the following manner. A 0.03 mole portion of the ether was added to a 25 ml. flask containing 0.01 mole tri-n-butyl antimonite dissolved in 15–20 gms. of triethylene glycol. Then the mixture was heated with a mantle while stirring magnetically. The decomposition temperature was that at which a gray color appears. A decomposition temperature of >285° C. was observed, as contrasted with a decomposition temperature of 240°–250° C for a control containing only .01 mole tri-n-butyl antimonite.

EXAMPLE 2

The screening test described in Example 1 was followed with the exception that tetraethylene glycol was employed as the solvent instead of triethylene glycol. A control employing only .01 mole of tri-n-butyl antimonite resulted in a decomposition temperature of 240°–250° C. When allyl glycidyl ether was employed in three tests wherein the mole ratio of the ether to the antimonite was 3:1, 2:1 and 1:1, decomposition temperatures of >300° C, >300° C and 260° C respectively were observed.

EXAMPLES 3 – 5

The screening test of Example 2 was repeated for other ethylenically unsaturated compounds. The results are set forth in the Table where the ratio is the mole ratio of ethylenically unsaturated compound to tributyl antimonite.

TABLE

| Example | Ethylenically Unsaturated Compound | Ratio | TD° C. |
|---------|-----------------------------------|-------|--------|
| 3 | Diallyl ether | 3:1 | 300 |
| 4 | Allyl alcohol | 100:3 | >300 |
| 5 | Allyl alcohol | 30:9 | 270 |

EXAMPLE 6

Bis(hydroxyethyl) terephthalate (33.0 gms.), triphenyl phosphite (0.020 gms.), tri-n-butyl antimonite (0.30 gms; 0.09 milimoles) and allyl glycidyl ether (0.34 gms; 0.30 milimole) were mixed in a 50 ml 2-neck flask equipped with a magnetic stirrer, a short-path distillation head and a thermometer. The mixture was heated to about 160° C. and a vacuum applied. The polycondensation was carried out at a temperature up to 280° C. and a pressure of 1 mmHg over a period of 1 hour. Seven to eight grams of ethylene glycol were distilled out of the mixture.

The resultant polymer was poured onto a watch glass, cooled and ground to a fine powder in a high speed blender. The powder was placed in a Petri-dish to form a layer about one-quarter inch thick and held in place with a large rubber stopper. The color of the sample was then measured on a Hunterlab Model D25Color Difference Meter, sold by Hunter Associates Laboratory, McLean, Virginia, employing Hunterlab Standard T400 for color difference meter 45° 0° geometry, CIE illuminant C, ASTM D2244-647 standard; MgO (ASTM E-259). The polymer had an L value of 87.4.

COMPARATIVE EXAMPLE 1

The polycondensation step of Example 6 was repeated with the exception that tri-n-butyl antimonite (0.30 gms.) was employed without allyl glycidyl ether. The color of five samples of the resultant polymer was measured, and an average L value of 81.7 was obtained. This indicates that the use of catalyst without stabilizer results in graying.

EXAMPLE 7

Bis(hydroxyethyl) terephthalate was polymerized according to conventional techniques in the presence of a mixture of tri-n-butyl antimonite and allyl glycidyl ether. The mole ratio of the antimonite to the ether was 1:3. The resulting polymer had a $\overline{M}_w$ of 52900 and a $\overline{M}_N$ of 18150. The $\overline{M}_w/\overline{M}_N$ was 2.92.

COMPARATIVE EXAMPLE 2

For purposes of comparison, Example 7 was repeated, but employing only tri-n-butyl antimonite instead of the mixture of antimonite and ether. The resulting polymer had a $\overline{M}_w$ of 32,132; a $\overline{M}_N$ of 11,600 and a $\overline{M}_w/\overline{M}_N$ of 2.77. This data revealed that a lower molecular weight polymer had been formed than that of Example 4, indicating a slower rate of polymerization where the antimonite alone was employed even though the antimonite was added at a constant level.

EXAMPLE 8

Example 7 was repeated with the exception that the mixture of tri-n-butyl antimonite and allyl glycidyl ether was added at the beginning of the reaction where dimethyl terephthalate was reacted with ethylene glycol to provide the bis(hydroxyethyl) terephthalate. The resulting polymer had a $\overline{M}_w$ of 40,800 and a $\overline{M}_N$ of 10,200. The $\overline{M}_w/\overline{M}_N$ was 3.98.

What is claimed is:

1. A process for preparing polyesters comprising condensing glycol terephthalate at a temperature of 150° C. to 350° C. in the presence of a catalyst system which comprises an antimony-containing polycondensation catalyst and an ethylenically unsaturated compound having the formula

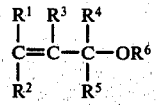

wherein $R^1$, $R^2$, $R^3$, $R^4$ and $R^5$ are independently selected hydrogen, alkyl, aryl, substituted alkyl or substituted aryl; and $R^6$ is hydrogen, alkyl, aryl, acyl, allyl or epoxypropyl, the mole ratio of ethylenically unsaturated bond in said ethylenically unsaturated compound to said antimony-containing polycondensation catalyst being 1:1 to 30:1.

2. The process of claim 1 wherein said antimony-containing polycondensation catalyst is an antimony alkoxide and $R^1$, $R^2$, $R^3$, $R^4$ and $R^5$ in said ethylenically unsaturated compound are hydrogen and $R^6$ is allyl or glycidyl.

3. The process of claim 2 wherein said ethylenically unsaturated compound is allyl glycidyl ether.

4. The process of claim 2 wherein said ethylenically unsaturated compound is allyl alcohol.

5. The process of claim 2 wherein said ethylenically unsaturated compound is diallyl ether.

6. The process of claim 2 wherein said catalyst system comprises the product made by reacting said antimony alkoxide and said ethylenically unsaturated compound at between about 0° C. and 250° C.

7. The process of claim 6 wherein said ethylenically unsaturated compound is allyl alcohol.

* * * * *